US012640942B2

(12) United States Patent
Wei et al.

(10) Patent No.: US 12,640,942 B2
(45) Date of Patent: May 26, 2026

(54) INFORMATION PROCESSING METHOD AND APPARATUS, ELECTRONIC DEVICE, AND STORAGE MEDIUM

(71) Applicants: Beijing BOE Technology Development Co., Ltd., Beijing (CN); BOE Technology Group Co., Ltd., Beijing (CN)

(72) Inventors: Xiangye Wei, Beijing (CN); Liming Xiu, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 494 days.

(21) Appl. No.: 18/033,807

(22) PCT Filed: Oct. 28, 2020

(86) PCT No.: PCT/CN2020/124372
§ 371 (c)(1),
(2) Date: Apr. 26, 2023

(87) PCT Pub. No.: WO2022/087888
PCT Pub. Date: May 5, 2022

(65) Prior Publication Data
US 2023/0403166 A1 Dec. 14, 2023

(51) Int. Cl.
*H04L 9/32* (2006.01)
(52) U.S. Cl.
CPC .......... *H04L 9/3278* (2013.01); *H04L 9/3236* (2013.01)

(58) Field of Classification Search
CPC ........................... H04L 9/3278; H04L 9/3236
See application file for complete search history.

(56) References Cited

U.S. PATENT DOCUMENTS

| | | | |
|---|---|---|---|
| 10,917,250 B2 * | 2/2021 | Lewis | .................. H04L 9/0869 |
| 11,223,490 B2 * | 1/2022 | Merchan | .............. H04L 9/3278 |
| 11,777,747 B2 * | 10/2023 | Abbott | ................. H04L 9/0643 |
| | | | 713/189 |

(Continued)

*Primary Examiner* — John B King
*Assistant Examiner* — Alex D Carrasquillo
(74) *Attorney, Agent, or Firm* — Ling Wu; Stephen Yang; Ling and Yang Intellectual Property

(57) ABSTRACT

A data processing method, including: obtaining a challenge sequence of challenge-response pairs, and generating, by a physical unclonable function, an original response sequence corresponding to the challenge-response pairs; generating a first index parameter according to the challenge sequence, and obtaining feature bit information in the original response sequence according to the first index parameter; converting the challenge sequence to generate a second index parameter, and updating the first index parameter according to the second index parameter and the feature bit information; obtaining new feature bit information in the original response sequence according to the updated first index parameter; and repeatedly generating second index parameters, updating the first index parameter according to the second index parameters and the latest obtained feature bit information, and obtaining multiple pieces of feature bit information, to generate a target response sequence according to the multiple pieces of feature bit information.

10 Claims, 6 Drawing Sheets

(56) References Cited

U.S. PATENT DOCUMENTS

| | | | |
|---|---|---|---|
| 2009/0217045 A1* | 8/2009 | Skoric ................... | H04L 9/3278 |
| | | | 713/172 |
| 2010/0127822 A1* | 5/2010 | Devadas ............... | H04L 9/3278 |
| | | | 726/2 |
| 2011/0033041 A1* | 2/2011 | Yu ........................... | G06F 11/10 |
| | | | 714/E11.023 |
| 2012/0183135 A1* | 7/2012 | Paral ........................ | G09C 1/00 |
| | | | 380/44 |
| 2015/0195088 A1* | 7/2015 | Rostami ............... | H04L 9/3278 |
| | | | 380/28 |
| 2018/0145838 A1* | 5/2018 | Wang ................... | H04L 9/3278 |
| 2020/0044872 A1* | 2/2020 | Willsch ................ | H04L 9/3278 |
| 2022/0029833 A1* | 1/2022 | Poeppelmann ......... | H04L 9/088 |

* cited by examiner

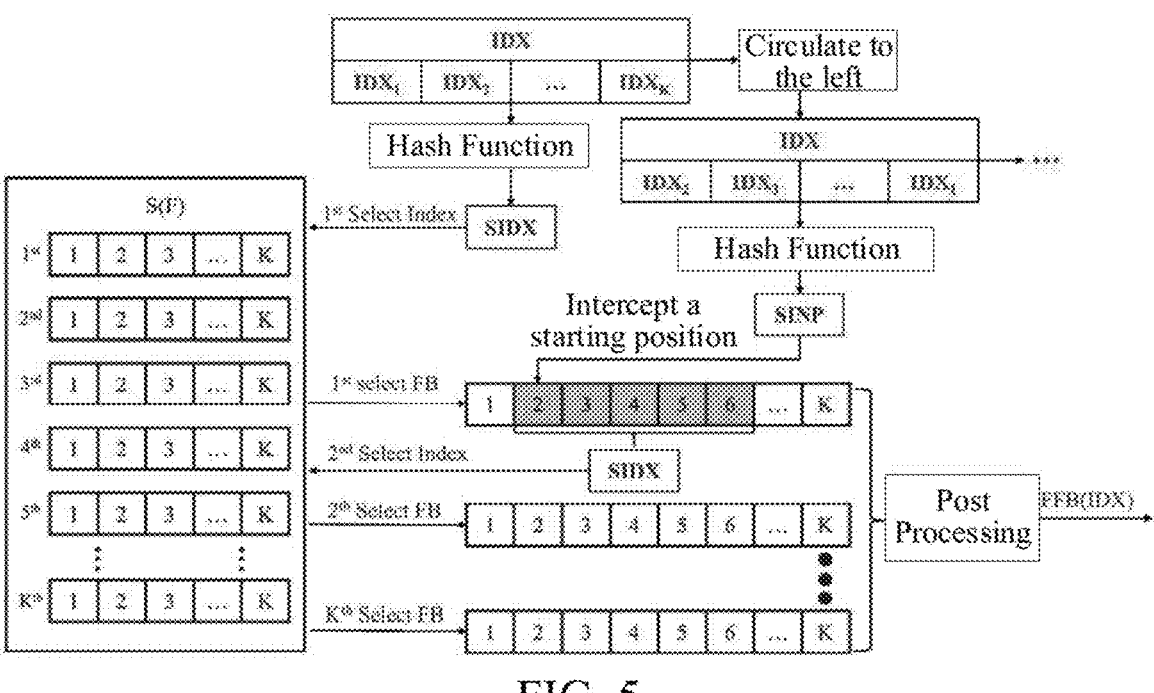

Shift the challenge sequence to the left by an offset value to convert the challenge sequence, and shorten the converted challenge sequence to the second index parameter with a preset length by using the Hash Function

S132

Decode the second index parameter to obtain an interception starting position, and intercept the feature bit information with the preset length according to the interception starting position to update the first index parameter

Perform post processing on multiple pieces of feature bit information to obtain a target response sequence after transformation

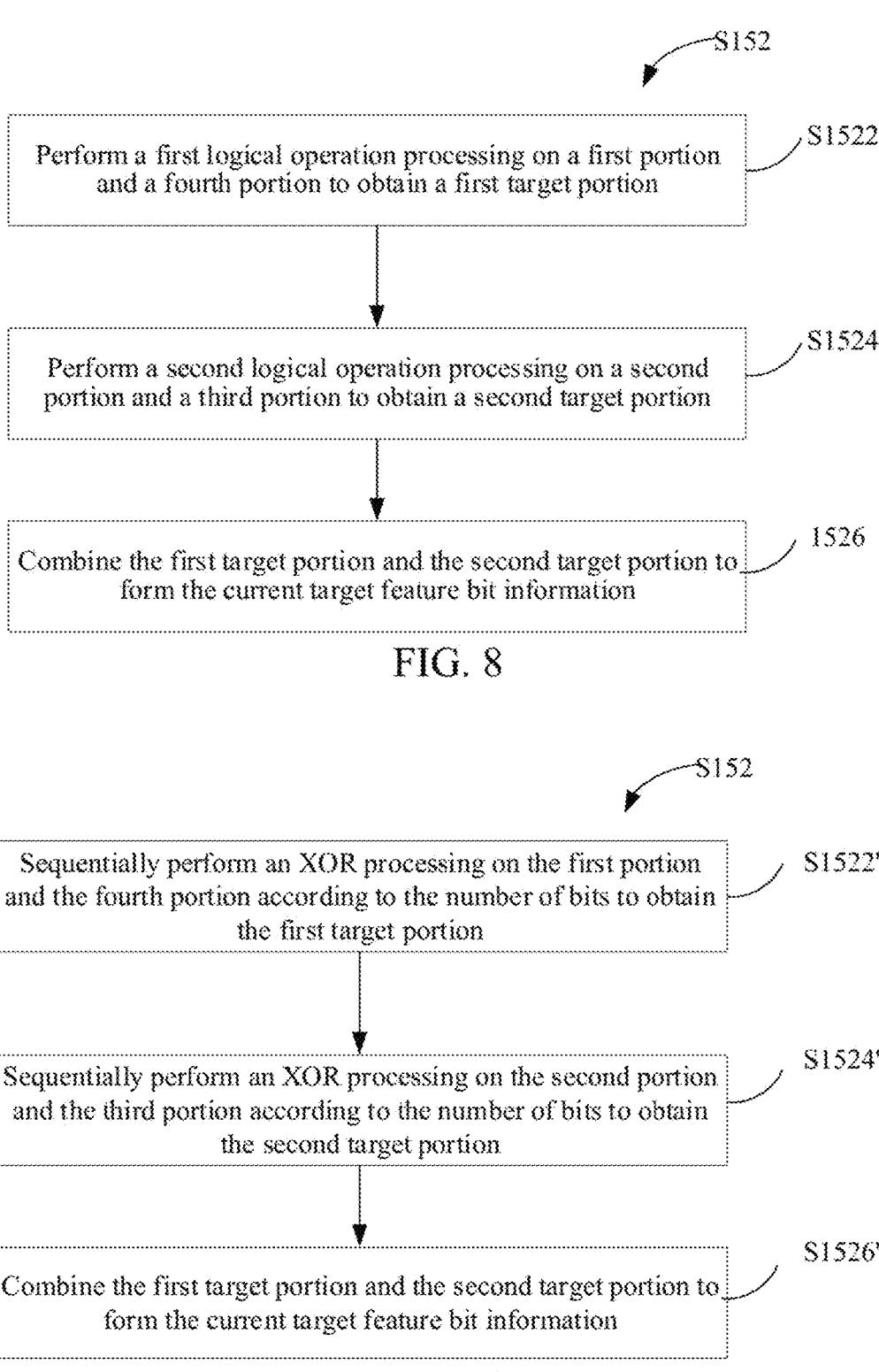

S152

Perform a first logical operation processing on a first portion and a fourth portion to obtain a first target portion — S1522

Perform a second logical operation processing on a second portion and a third portion to obtain a second target portion — S1524

Combine the first target portion and the second target portion to form the current target feature bit information — 1526

Sequentially perform an XOR processing on the first portion and the fourth portion according to the number of bits to obtain the first target portion — S1522'

Sequentially perform an XOR processing on the second portion and the third portion according to the number of bits to obtain the second target portion — S1524'

Combine the first target portion and the second target portion to form the current target feature bit information — S1526'

INFORMATION PROCESSING METHOD AND APPARATUS, ELECTRONIC DEVICE, AND STORAGE MEDIUM

CROSS-REFERENCE TO RELATED APPLICATION

The present application is a U.S. National Phase Entry of International Application PCT/CN2020/124372 having an international filing date of Oct. 28, 2020, and entitled "Information Processing Method and Apparatus, Electronic Device, and Storage Medium", the contents of the above-identified application are incorporated herein by reference.

TECHNICAL FIELD

The application relates to the field of information security, in particular to an information processing method, an information processing apparatus, an electronic device and a computer storage medium.

BACKGROUND

In the related technologies, Physical Unclonable Function (PUF) technology can be used for solving the hardware security problem, so as to achieve protection on hardware. PUF is a new circuit architecture, which is used for extracting a process deviation of hardware in a manufacturing process, and converting the process deviation into a unique digital mark, so that this digital mark becomes a digital fingerprint of the integrated circuit. Authentication, authorization, data encryption, privacy protection and other operations may be performed through the Physical Unclonable Function. The main function of PUF is to receive an input, which is also called a challenge. After receiving the input, the Physical Unclonable Function generates a unique response. Each pair of challenge and responses is called a challenge response pair. Generally, the more challenge response pairs, the higher the security and the harder it is to crack.

However, most Physical Unclonable Functions have a limited number of challenge response pairs, and in order to prevent outlaws from attacking repeatedly by utilizing challenge response pairs used after being authorized, the challenge response pairs need to be deleted after each authorized use, so that the Physical Uncloned Function has a limited product cycle. How to increase the number of challenge response pairs to improve the security of the Physical Uncloned Function and prolong its life cycle has become a problem to be solved urgently.

SUMMARY

In view of this, the present application provides an information processing method, an information processing apparatus, an electronic device and a computer storage medium.

The information processing method of the implementation of the present application includes the following steps: acquiring a challenge sequence of a challenge response pair, generating an original response sequence corresponding to the challenge response pair through a Physical Uncloned function;

generating a first index parameter according to the challenge sequence, and acquiring feature bit information in the original response sequence according to the first index parameter;

2 converting the challenge sequence to generate a second index parameter, and updating the first index parameter according to the second index parameter and the feature bit information;

acquiring new feature bit information in the original response sequence according to the updated first index parameter; and repeatedly generating second index parameters, and updating the first index parameter according to the second index parameters and latest acquired feature bit information, and acquiring multiple pieces of feature bit information to generate a target response sequence according to the multiple pieces of feature bit information.

In some implementations, generating the first index parameter according to the challenge sequence includes:

shortening the challenge sequence to the first index parameter with a preset length by using a Hash Function.

In some implementations, converting the challenge sequence to generate the second index parameter includes:

shifting the challenge sequence to the left by an offset value to convert the challenge sequence, and shortening the converted challenge sequence to the second index parameter with a preset length by using the Hash Function.

In some implementations, the offset value is determined according to the number of the multiple pieces of feature bit information acquired.

In some implementations, updating the first index parameter according to the second index parameter and the feature bit information includes: decoding the second index parameter to obtain an interception starting position, and intercepting the feature bit information with the preset length according to the interception starting position to update the first index parameter.

In some implementations, the information processing method includes: performing post processing on the multiple pieces of feature bit information to obtain a target response sequence after transformation.

In some implementations, current feature bit information is divided into a first portion and a second portion, a next piece of feature bit information is divided into a third portion and a fourth portion, and performing the post processing on the multiple pieces of feature bit information includes:

performing a first logical operation processing on the first portion and the fourth portion to obtain a first target portion;

performing a second logical operation processing on the second portion and the third portion to obtain a second target portion; and combining the first target portion and the second target portion to form the current target feature bit information.

In some implementations, a length of the first portion is the same as a length of the fourth portion, the second portion and the third portion have the same length, and performing the post processing on the multiple pieces of feature bit information includes:

sequentially performing an XOR processing on the first portion and the fourth portion according to the number of bits to obtain the first target portion;

sequentially performing an XOR processing on the second portion and the third portion according to the number of bits to obtain the second target portion; and combining the first target portion and the second target portion to form the current target feature bit information.

An information processing apparatus according to an implementation of the present application includes:

a sequence acquisition module configured to acquire a challenge sequence of a challenge response pair and generate an original response sequence corresponding to the challenge response pair through a Physical Uncloned Function;

a first information acquisition module configured to generate a first index parameter according to the challenge sequence and acquire feature bit information in the original response sequence according to the first index parameter;

a parameter update module configured to convert the challenge sequence to generate a second index parameter and update the first index parameter according to the second index parameter and the feature bit information;

a second information acquisition module configured to acquire new feature bit information in the original response sequence according to the updated first index parameter; and a processing module configured to repeatedly generate second index parameters and update the first index parameter according to the second index parameter and latest acquired feature bit information and obtain multiple pieces of feature bit information to generate a target response sequence according to the multiple pieces of feature bit information.

An electronic device according to an implementation of the present application includes one or more processors and a memory; and one or more programs, which are stored in the memory and executed by the one or more processors, wherein the programs include instructions for executing any one of the information processing method described above.

A computer storage medium according to an implementation of the present application stores a computer program, which is executed by a processor to perform any one of the information processing method described above.

In the information processing method, apparatus, computer storage medium, and electronic device according to the implementations of the present application, a corresponding original response sequence is generated according to an acquired challenge sequence through a Physical Uncloned Function, and multiple pieces of feature bit information are acquired from the original response sequence according to the challenge sequence, so that a target response sequence is generated according to the multiple pieces of feature bit information, which enables the challenge sequence and the target response sequence to become a challenge response pair, and in this way, multiple pieces of target challenge response pairs may be obtained, which increases the complexity of the circuit, improves the security of the PUF and effectively prevents external simulation and cracking.

Additional aspects and advantages of the implementations of the present application will be partially shown in following description, or a part of additional aspects and advantages of the implementations of the present application become apparent in following description, or will be learned from practice of the implementations of the present application.

BRIEF DESCRIPTION OF DRAWINGS

The above and/or additional aspects and advantages of the present application will become apparent and easily understandable from following description of implementations with reference to accompanying drawings.

FIG. 5 is a schematic diagram of a flow of an information processing process according to the implementation of the present application.

FIG. 6 is a schematic diagram of a flow of an information processing method according to another implementation of the present application.

FIG. 7 is a schematic diagram of a flow of an information processing method according to another implementation of the present application.

FIG. 8 is a schematic diagram of a flow of an information processing method according to another implementation of the present application.

FIG. 9 is a schematic diagram of a flow of an information processing method according to another implementation of the present application.

Figure 1:
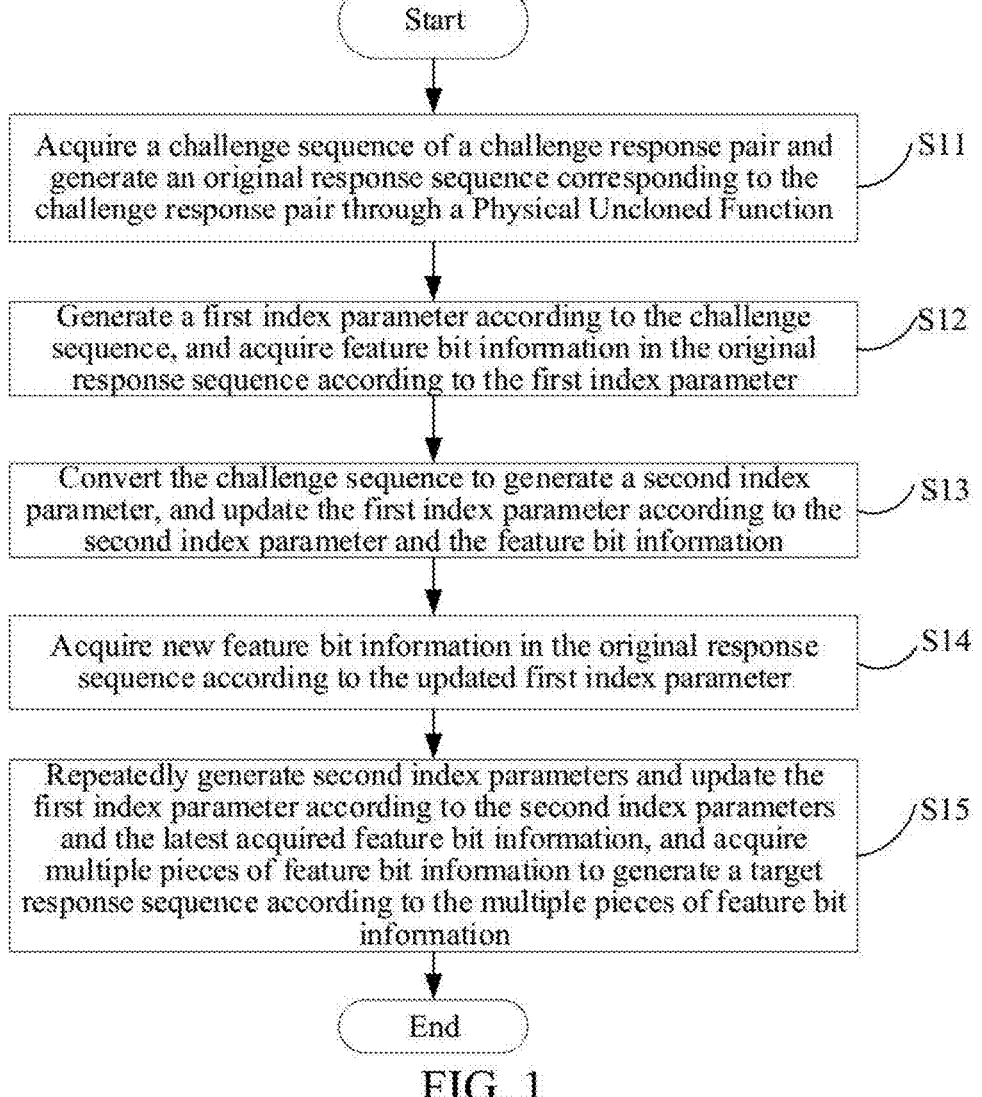
FIG. 1 is a schematic diagram of a flow of an information processing method according to an implementation of the present application.

DESCRIPTION OF MAIN ELEMENT SYMBOLS information processing apparatus 10, sequence acquisition module 11, first information acquisition module 12, parameter update module 13, second information acquisition module, processing module 15, processor 20, memory 30, program 32, communication module 50, storage medium 40, computer program 42, electronic device 100, first index parameter SIDX, second index parameter SINP, challenge sequence c, original response sequence S(F), feature bit information FB, target feature bit information FFB, target response sequence FFB (IDX).

DETAILED DESCRIPTION

Descriptions will now be made in detail to embodiments, illustrations of which are shown in the accompanying drawings. The same or similar, or functionally same or similar elements are indicated by same or similar reference numerals throughout the descriptions. The implementations described herein with reference to the accompanying drawings are exemplary, only used for explaining the present application, and should not be construed as limitations the present application.

In addition, it is to be understood that terms such as "first" and "second" are used herein for purposes of description and are not intended to indicate or imply relative importance or significance. Therefore, a feature defined by "first" and "second" may explicitly or implicitly indicate inclusion of one or more such features. In the description of the present application, a meaning of "multiple" is two or more than two, unless otherwise explicitly limited.

In the description of the present application, it should be noted that unless otherwise specified and limited, the terms "mount", "connected" and "connect" should be understood in a broad sense. For example, a connection may be fixed connection, detachable connection or integrated connection, may be mechanical connection, electrical connection or communicable, or may be direct connection, indirect connection through intermediate medium, internal communication between two elements, or interaction between two elements. For those of ordinary skills in the art, specific meanings of the above terms in the present application may be understood according to specific situations.

In the following, many different implementations or examples are provided for implementing different structures of the present application. In order to simplify the disclosure of the present application, components and arrangements of specific examples are described below. Of course, they are examples only and are not intended to limit the present application. In addition, in the present application, reference numbers and/or reference letters may be repeated in different examples. Such repetition is for a purpose of simplification and clarity, and it does not indicate a relationship between various implementations and/or arrangements discussed.

Descriptions will now be made in detail to embodiments, illustrations of which are shown in the accompanying drawings. The same or similar, or functionally same or similar elements are indicated by same or similar reference numerals throughout the descriptions. The implementations described herein with reference to the accompanying drawings are exemplary, only used for explaining the present application, and should not be construed as limitations on the present application.

Under the background of the new infrastructure of Internet of Things and artificial intelligence, security and credibility have become the foundation of technology development, and equipment verification, intelligent contract, intelligent log, blockchain, digital currency and face recognition all need the guarantee from security modules. Usually, security of Internet of Things includes multiple levels of protection, such as hardware security, system security, firmware security, software security, application security, etc., wherein the hardware security is a foundation for all levels and a starting point of the whole trusted chain. For hardware security, most of the conventional schemes will be implemented by software. However, many prior arts can crack the conventional key, such as by replicable identity, multiple intrusion interfaces, etc., which makes the conventional key insufficient to ensure the security of hardware.

In order to effectively solve this kind of security problems, Physical Uncloned Function (PUF) technology came into being. As a new hardware security primitive, Physical Uncloned Function technology may deal with security problems more effectively. Physical Uncloned Function is a new circuit architecture, which is used for extracting a process deviation in a manufacturing process of integrated circuits and converting it into a unique digital mark, so that this digital mark may become the digital fingerprint of this circuit or its corresponding chip. Authentication, authorization, data encryption, privacy protection and other operations may be completed through the Physical Unclonable Function technology. Although Physical Unclonable Function technology is simple to be implemented, it has very high security, and at the same time, an output response of Physically Uncloned Function also has excellent tamper-proof properties. Because the essential property of the Physically Uncloned Function is derived from an inevitable tiny delay difference in a chip manufacturing process, and this tiny difference is rooted in the deep submicron or even nanoscale physical structure, any possible physical attack will destroy the tiny physical features of the Physically Uncloned Function, which makes its output response change significantly, so that the Physically Uncloned Function has natural ability of resisting invasive and semi-invasive physical attacks.

A main function of the Physical Uncloned Function is to receive a challenge, which is also called an input. After receiving a challenge, the Physical Uncloned Function generates a unique response corresponding to the challenge. Each pair of challenge and response is called a challenge response pair. Usually, in order to prevent outlaws from attacking repeatedly by using the challenge response pair which has been authorized to be used, the challenge response pair needs to be deleted after each authorized use, so the more challenge response pairs of the Physical Uncloned Functions, the higher the security and the harder it is to crack. However, most Physical Uncloned Functions have a limited number of challenge response pairs, which results in that their life cycle is limited, so how to increase the number of challenge response pairs to improve the security of the Physical Uncloned Functions and delay their life cycle has become a key to the problem.

Referring to FIG. 1, in view of this, an implementation of the present application provides an information processing method, including:

step S11: acquiring a challenge sequence of a challenge response pair and generating an original response sequence corresponding to the challenge response pair through a Physical Uncloned Function;

step S12: generating a first index parameter according to the challenge sequence, and acquiring feature bit information in the original response sequence according to the first index parameter;

step S13: converting the challenge sequence to generate a second index parameter, and updating the first index parameter according to the second index parameter and the feature bit information;

step S14: acquiring new feature bit information in the original response sequence according to the updated first index parameter; and step S15: repeatedly generating second index parameters and updating the first index parameter according to the second index parameter and the latest acquired feature bit information, and acquiring multiple pieces of feature bit information to generate a target response sequence according to the multiple pieces of feature bit information.

Figure 2:
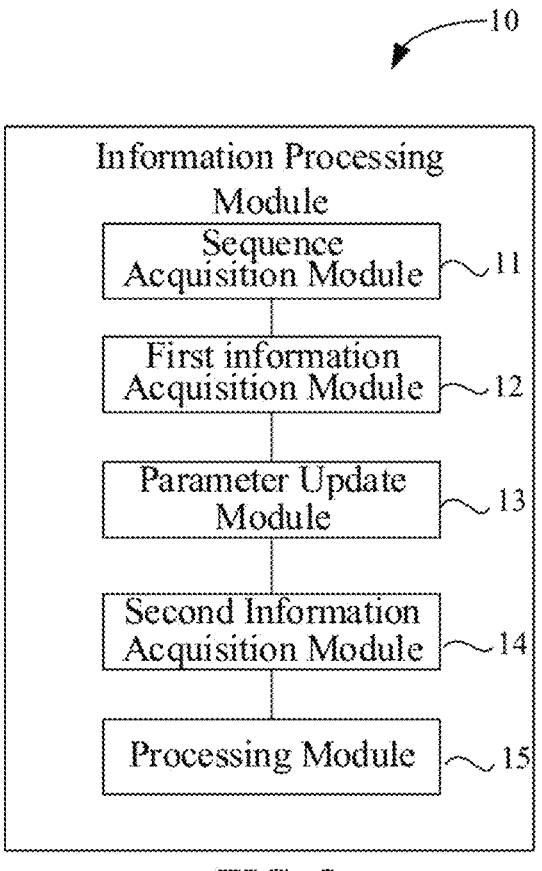
FIG. 2 is a schematic diagram of modules of an information processing apparatus according to an implementation of the present application.

Referring to FIG. 2, an embodiment of the present application further provides an information processing apparatus 10, including a sequence acquisition module 11, a first information acquisition module 12, a parameter update module 13, a second information acquisition module 14, and a processing module 15. The step S11 may be implemented by the sequence acquisition module 11, the step S12 may be implemented by the first information acquisition module, the step S13 may be implemented by the parameter update module 13, the step S14 may be implemented by the second information acquisition module 14, and the step S15 may be implemented by the processing module 15.

This means that, the sequence acquisition module 11 may be used for acquiring a challenge sequence of the challenge response pair and generating an original response sequence corresponding to the challenge response pair through the Physical Uncloned Function.

The first information acquisition module 12 may be used for generating a first index parameter according to the challenge sequence and acquiring feature bit information in the original response sequence according to the first index parameter.

The parameter update module 13 may be used for converting the challenge sequence to generate a second index parameter and updating the first index parameter according to the second index parameter and the feature bit information.

The second information acquisition module 14 may be used for acquiring new feature bit information in the original response sequence according to the updated first index parameter.

The processing module 15 may be used for repeatedly generating the second index parameter and updating the first index parameter according to the second index parameter and the latest acquired feature bit information and obtaining the multiple pieces of feature bit information to generate a target response sequence according to the multiple pieces of feature bit information.

Figure 3:
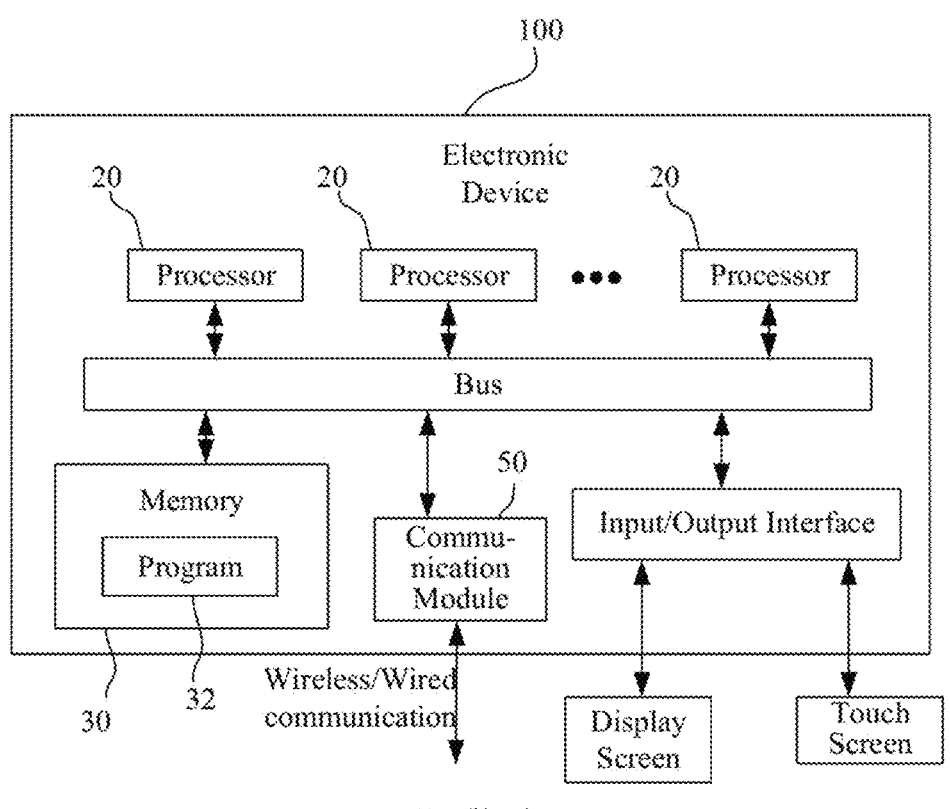
FIG. 3 is a schematic diagram of modules of an electronic device according to an implementation of the present application.

Referring to FIG. 3, an implementation of the present application further provides an electronic device 100, wherein the electronic device 100 includes one or more processors 20, a memory 30, and one or more programs 32. The one or more programs 32 are stored in the memory 30 and executed by the one or more processors 20. The one or more programs 32 are executed by the one or more processors 20 to perform instructions from the information processing method.

Figure 4:
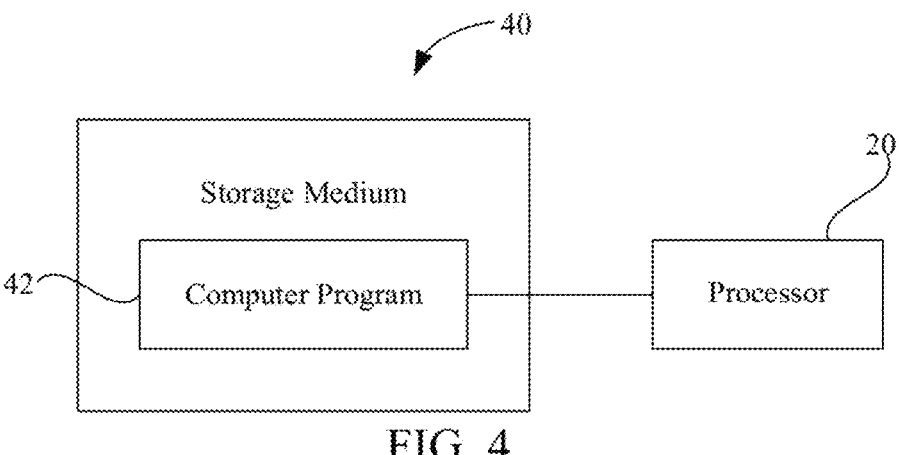
FIG. 4 is a schematic diagram of a module in which a processor is connected with a storage medium according to an implementation of the present application.

Referring to FIG. 4, an implementation of the present application further provides a non-volatile computer readable storage medium 40. A computer program 42 is stored in the computer program 42. When the computer program 42 is executed by one or more processors 20, the one or more processors 20 execute the information processing method described above.

In the information processing method, the information processing apparatus 10, the electronic device 100 and the storage medium 40 according to the implementations of the present application, by defining a challenge sequence, a corresponding response sequence is generated from a physical non-replicable function, multiple pieces of feature bit information is acquired from the response sequence according to the challenge sequence, and the multiple pieces of bit information are generated into a target response sequence, so that expansion of challenge response pairs is achieves, thus the complexity of the circuit is increased and the security of the PUF is improved. The circuit structure of the PUF prevents external simulation and cracking.

In some implementations, the electronic device 100 may be a mobile phone, a computer, etc.

In some implementations, the information processing apparatus 10 may be part of the electronic device 100. In other words, the electronic device 100 includes the information processing apparatus 10.

In some implementations, the information processing apparatus 10 may be a discrete component assembled in a manner to have the aforementioned function, or an IC having the aforementioned function in the form of an integrated circuit, or a computer software code segment that enables a computer to have the aforementioned function while running on the computer.

In some implementations, the information processing apparatus 10, as hardware, may be attached to a computer or computer system independently or as an additional peripheral element. The information processing apparatus 10 may also be integrated into a computer or computer system. For example, when the information processing apparatus 10 is part of the electronic device 100, the information processing apparatus 10 may be integrated into the processor 20.

In some implementations where the information processing apparatus 10 is part of the electronic device 100, the corresponding code segment, as software, of the information processing apparatus 10 may be stored on a memory 30 and executed by a processor 20 to implement the aforementioned functions. Alternatively, the information processing apparatus 10 includes one or more of the aforementioned programs 32 or the one or more of the aforementioned programs 32 includes the information processing apparatus.

In some implementations, the computer-readable storage medium 40 may be a storage medium built into the electronic device 100, such as a memory 30, or a storage medium which is in pluggable connection with the electronic device 100, such as an SD card, etc.

Further referring to FIG. 3, in some implementations, the electronic device 10 may further include a communication module 50. The electronic device 10 outputs processed data and/or inputs data to be processed by the electronic device 100 from an external device through the communication module 50. For example, the processor 20 is used for controlling the communication module 50 to input and/or output data.

It should be noted that, a response of a challenge response pair is generated by the Physical Uncloned Function according to a challenge, that is, one response corresponds to one challenge, so the number of challenge response pairs is proportional to the number of the challenges. Understandably, the Physical Uncloned Function is a circuit architecture, which is a digital fingerprint of a circuit or a chip corresponding to the circuit, and the Physical Uncloned Function may only recognize a code composed of 0 or 1, so the challenge is also a code composed of several 0 or 1. The number of challenges is related to the number of the bits of the codes, and the more bits of the codes, the more challenges. For example, if the number of the bits of the codes is n, the number of challenges is $2^n$, and the number of challenge response pairs obtained is also $2^n$.

Referring to FIG. 5, therefore, in order to increase the number of challenge response pairs, the challenge sequence c is defined to be composed of k elements IDX in this application, i.e., $c=\{IDX_1, IDX_2, IDX_3, \ldots, IDX_K\}$, moreover, each element is one index bit, and a length of IDX of each element is n bits, where k is equal to $2^n$. An exact value of n is not limited, for example, n may be 8, that is, if the bit length of each element IDX is 8 bits, then k is equal to $2^8$, which is equal to 256. The challenge sequence c may include $2^n*k$, that is, the number of challenge response pairs is $2^n*k$.

As such, a processor 20 may acquire the challenge sequence $c=\{IDX_1, IDX_2, IDX_3, \ldots, IDX_K\}$, and an original response sequence S(F) uniquely corresponding to the challenge sequence c may be obtained by the Physical Uncloned Function. Among them, the obtained original response sequence S(F) is an array composed of K*K elements.

Further, after obtaining the challenge sequence c and the original response sequence S(F), the processor 20 may process the challenge sequence c to map the challenge sequence c to be the first index parameter SIDX with a preset length n according to a mapping function, and intercept the original response sequence S(F) according to the first index parameter SIDX to obtain corresponding feature bit (FB) information, and the feature bit information refers to a sequence containing K bits.

Specifically, in some implementations, step S12 may include: shortening the challenge sequence to the first index parameter with a preset length by using a Hash Function.

Accordingly, the processor 20 may process the challenge sequence c according to the Hash Function (Hash) to generate the first index parameter SIDX with a preset length n, i.e. the processor 20 may be used for shortening the challenge sequence to the first index parameter with a preset length by the Hash Function. For example, the processor 20 may be configured with the Hash Function, so that the processor 20 may map the challenge sequence c to be the first index parameter SIDX with the preset length n. Those in the related art may understand that the Hash Function is a kind of function which can transform an input with any length into an output with a fixed length by a hashing algorithm.

Understandably, since the length of the challenge sequence c is n*k and the length of the first index parameter SIDX is n, that is, the length of the first index parameter SIDX is smaller than the length of the challenge sequence c, by mapping the challenge sequence c to be the first index parameter SIDX with the length n, one possible purpose or effect is to reduce the amount of data, that is, the length of the challenge sequence can be shortened to the first index parameter SIDX with the preset length through the Hash Function, so as to subsequently acquire the feature bit information FB in the original response sequence according to the first index parameter SIDX, which makes the acquisition of the feature bit information FB complicated and confusing, and at the same time, the selection of the feature bit information FB in the original response sequence S(F) is also associated with the challenge sequence c.

It should also be noted that, since the original response sequence S(F) is a k*k matrix, that is, the original response sequence S(F) includes K rows, and each row includes k elements, in the present application, each row of elements are used as the feature bit information FB in the present application, so that the processor 20 may select a corresponding row in the original response sequence S(F) according to a value represented by the first index parameter SIDX to obtain the feature bit information FB.

Specifically, after generating the first index parameter SIDX, the processor 20 decodes the first index parameter SIDX to obtain the value represented by the first index parameter SIDX, and selects the corresponding row in the original response sequence S(F) according to the value so as to obtain the feature bit information FB. For example, if a word length n of the first index parameter SIDX is equal to 3, the original response sequence S(F) includes eight rows, i.e., from the 0-th row to the 7-th row, and the first index parameter SIDX is 010, the value represented by the first index parameter SIDX is 3, and the elements in the third row selected from the original response sequence S(F) are used as the feature bit information FB.

After obtaining the feature bit information FB, the challenge sequence c is processed to obtain a new challenge sequence c from the challenge sequence c. For example, the elements in the challenge sequence c may be transformed in order of arrangement to obtain a new challenge sequence c.

Referring to FIG. 6, in some implementations, the step S13 includes the following step:

step S132: shifting the challenge sequence to the left by an offset value to convert the challenge sequence, and shortening the converted challenge sequence to a second index parameter with a preset length by using the Hash Function.

In some implementations, the step S132 may be implemented by the parameter update module 13, or the parameter update module 13 may be used for shifting the challenge sequence to the left by the offset value to convert the challenge sequence, and the converted challenge sequence is shortened to a second index parameter with a preset length by using the Hash Function.

In some implementations, the processor 20 is used for shifting the challenge sequence to the left by the offset value to convert the challenge sequence, so as to shorten the converted challenge sequence to the second index parameter with the preset length by using the Hash Function.

Understandably, due to the challenge sequence c={IDX$_1$, IDX$_2$, IDX$_3$, . . . , IDX$_K$}, lengths of different challenge sequences c are all equal, and the difference is only that the elements IDX in the challenge sequences c are different, so the challenge sequence c may be shifted to the left by the offset value to convert the challenge sequence c to obtain a new challenge sequence c. Thus, the new challenge sequence c generates the second index parameter SINP different from the first index parameter SIDX through the Hash Function.

Evidently, in some implementations, the challenge sequence c may also be shifted to the right by an offset value to convert the challenge sequence c to obtain a new challenge sequence c. Specifically, the offset direction is not limited.

It should be noted that, after the challenge sequence is shifted to the left by the offset value, an offset portion on the left of the challenge sequence may be circulated to the rear side of the new challenge sequence. In one example, for the challenge sequence c={IDX$_1$, IDX$_2$, IDX$_3$, . . . , IDX$_K$}, the length of the element IDX may be n, and if the offset value is n, the challenge sequence c may be shifted to the left by n bits to obtain a new challenge sequence c={IDX$_2$, IDX$_3$, IDX$_4$, . . . , IDX$_K$, IDX$_1$}.

Further, the new challenge sequence c is processed by the Hash Function to obtain a second index parameter SINP, and a length of the second index parameter SINP is equal to a length of the first index parameter SIDX, i.e. both are n bits.

In some implementations, the step S13 includes:

step S134: decoding the second index parameter to obtain an interception starting position, and intercepting the feature bit information with the preset length according to the interception starting position to update the first index parameter.

In some implementations, the step S134 may be implemented by the parameter update module 13, that is, the parameter update module 13 may be used for decoding the second index parameter to obtain an interception starting position, and intercepting the feature bit information with the preset length according to the interception starting position to update the first index parameter.

In some implementations, the processor 20 is used for decoding the second index parameter to obtain an interception starting position, and intercepting the feature bit information with the preset length according to the interception starting position to update the first index parameter.

In this way, the second index parameter SINP is decoded to obtain a decoded value of the second index parameter SINP, and by taking the value obtained by decoding the second index parameter SINP as the interception starting position, the feature bit information FB is intercepted to obtain a temporary index parameter with a length of n bits, by which then the first index parameter SIDX is replaced to obtain the updated first index parameter SIDX.

It should be noted that, if the decoded value of the second index parameter SINP with the length of n bits is s, and s is less than or equal to K, the s-th bit from left to right is a starting position for updating the first index parameter SIDX, and an ending position is the (s+n−1)-th bit, and if s+n−1>K, it circulates to the leftmost side, so as to intercept the index parameter with the length of n bits.

For example, the length n of the second index parameter SINP is 3 bits, the length k of the feature bit information FB is 8 bits, the feature bit information FB is 11010101 specifically, and the first index parameter is 110. If the second index parameter SINP is 010 specifically, 010 is decoded to obtain a decoded value S=3 of the second index parameter SINP, and the third bit in the original response sequence S(F) is selected as the starting position of the index parameter, and the third, fourth and fifth bits from left to right in the original response sequence S(F) are selected to obtain the temporary index parameter, which is 010. Furthermore, the first index parameter 110 is replaced by the obtained 010, so as to obtain an updated first index parameter 010. If the second index parameter SINP is 110, the second index parameter SINP is decoded to obtain a decoded value S=7, and the seventh bit in the feature bit information FB is selected as the starting position of the index parameter, and the seventh, eighth and first bits from left to right in the original response sequence S(F) are selected as the temporary index parameter, that is, the temporary index parameter consists of the seventh, eighth and first bits, which is 011. Furthermore, the first index parameter SIDX is replaced by the obtained 011, and in this way, the value of the updated first index parameter SIDX is 011.

Further, the updated first index parameter SIDX is decoded to obtain a value corresponding to the updated first index parameter SIDX, and furthermore, the corresponding row in the original response sequence S(F) is selected according to the value to obtain new feature bit information FB. For example, if the first index parameter SIDX is 011, the value represented by the first index parameter SIDX is 4, and the element in the fourth row of the original response sequence S(F) is selected as the new feature bit information FB.

After obtaining the new feature bit information FB, it may be understood that, since the initial response sequence is an array composed of K*K elements, and the feature bit information FB is one row in the initial response sequence S(F), it is necessary to obtain multiple pieces of feature bit information FB in order to make the target response sequence FFB (IDX) correspond to the initial response sequence image S(F). Thus, the processor 20 also circulates the process of obtaining the new feature bit information FB so as to obtain multiple pieces of new feature bit information FB. That is, the processor 20 repeats the above steps 13 and 14, until k pieces of feature bit information FB are obtained. Furthermore, the processor processes the k pieces of feature bit information FB to generate the target response sequence FFB (IDX) formed by an array of K*K elements. In this way, the expansion of the challenge response pair is achieved, and the complexity of the circuit structure of the PUF is increased, so that the security of the PUF is improved, which may effectively prevent external simulation and cracking, and in addition, prolong the life cycle of the PUF.

It should be noted that, the offset value may be determined according to the number of the pieces of feature bit information FB acquired, and the offset value is proportional to the number of the pieces of feature bit information FB acquired. In the present application, the offset value is a multiple of the number of the pieces of feature bit information FB, and a specific value of the initial offset value is less than k, which may be 2, 3, 4, 5, 8, 10 or a value which is much less than k, with no limit to the specific. For example, when the initial offset value is 3 and the number of the piece of feature bit information FB is 1, the offset value is 3, and when the number of the pieces of feature bit information FB is 2, the offset value is 6, that is, after each piece of new feature bit information FB is obtained, the challenge sequence c is shifted to the left for three times, so as to obtain a new challenge sequence c.

Referring to FIG. 7, in some implementations, the step S15 includes the following step:

step 152: performing post processing on the multiple pieces of feature bit information to obtain a target response sequence after transformation.

In some implementations, the step S152 may be implemented by the processing module 15, or the processing module 15 may be used for performing a post processing on the multiple pieces of feature bit information FB to obtain a target response sequence after transformation.

In some implementations, the processor 20 may also be used for performing a post processing on the multiple pieces of feature bit information FB to obtain a target response sequence after transformation.

It can be understood that, when the post processing is performed on the multiple pieces of feature bit information, the contents of the multiple pieces of feature bit information may be transformed so as to prevent the outside from obtaining the original data in the original response sequence, further protect the circuit structure of the Physical Uncloned Function, and prevent the outside from simulating and cracking.

Referring to FIG. 8, in some implementations, the current feature bit information is divided into a first portion and a second portion, and the next feature bit information is divided into a third portion and a fourth portion. The step S152 includes:

step S1522: performing a first logical operation processing on the first portion and the fourth portion to obtain a first target portion;

step S1524: performing a second logical operation processing on the second portion and the third portion to obtain a second target portion; and step S1526: combining first target portion and the second target portion to form the current target the feature bit information.

In some implementations, the steps S1522, S1524 and S1526 may be implemented by the processing module 15, or the processing module 15 may be used for performing a first logical operation on the first portion and the fourth portion to obtain a first target portion, for performing a second logical operation on the second portion and the third portion to obtain a second target portion, and for combining the first target portion and the second target portion to form the current target feature bit information.

In some implementations, the processor 20 may also be used for performing a first logical operation on the first portion and the fourth portion to obtain a first target portion, for performing a second logical operation on the second portion and the third portion to obtain a second target portion, and for combining the first target portion and the second target portion to form the current target feature bit information.

Specifically, in the post-processing process, the obtained feature bit information may be defined so that each piece of feature bit information is divided into two portions, wherein for multiple pieces of feature bit information acquired in sequence, the current feature bit information FB is defined as a first portion and a second portion, and the next feature bit information FB is divided into a third portion and a fourth portion. Then the first logical operation is performed on the first portion and the fourth portion to obtain the first target portion, and the second logical operation is performed on the second part and the third part to obtain the second target portion, wherein the first target portion and the second target portion are combined to form the current target feature bit information FB.

Further, the first logical operation and the second logical operation may be the same or different.

It should be noted that, since only k−1 pieces of target feature bit information may be obtained from the k pieces of feature bit information by the above definition and the XOR processing, the above processing is performed on the last obtained feature bit information and the first obtained feature bit information to generate one piece of target feature bit information. In this way, the k pieces of target feature bit information may be obtained.

Referring to FIG. 9, in some implementations, the first and fourth portions are of the same length, and the second and third portions are of the same length. The step S152 includes:

step S1522': sequentially performing an XOR processing on the first portion and the fourth portion according to the number of bits to obtain the first target portion;

step S1524': sequentially performing an XOR processing on the second portion and the third portion according to the number of bits to obtain the second target portion; and step S1526': combining the first target portion and the second target portion to form the current target feature bit information.

In some implementations, the steps S1522', S1524' and S1526' may be implemented by the processing module 15, or the processing module 15 may be used for performing an XOR processing of the first portion and the fourth portion by the number of bits sequentially to obtain a first target portion, for performing an XOR processing of the second portion and the third portion by the number of bits sequentially to obtain a second target portion, and for combining the first target portion and the second target portion to form the current target feature bit information.

In some implementations, the processor 20 may also be used for performing an XOR processing on the first portion and the fourth portion by the number of bits sequentially to obtain a first target portion, for performing an XOR processing on the second portion and the third portion by the number of bits sequentially to obtain a second target portion, and for combining the first target portion and the second target portion to form the current target feature bit information.

In this way, when a post processing is performed on multiple pieces of feature bit information, the adjacent current feature bit information and the next feature bit information may be divided and the corresponding XOR processing is performed, so that the outside cannot obtain the original data in the original response sequence according to the processed target bit information obtained, thus protecting the circuit structure of the Physical Uncloned Function and preventing the outside from simulating and cracking.

For example, in some examples, the multiple pieces of feature bit information FB includes first feature bit information FB1, second feature bit information FB2, and third feature bit information FB3, respectively, wherein the first feature bit information FB1 is equal to 10101, the second feature bit information FB2 is equal to 11011, and the third feature bit information FB3 is equal to 01010. The processor 20 may define the first feature bit information FB1 and the second feature bit information FB2, so as to divide the first feature bit information FB1 into two parts of 101 and 01, divide the second feature bit information FB2 into two parts of 11 and 011, and divide the third feature bit information FB3 into two parts of 010 and 10. An XOR processing is performed on the 101 and the 011 to obtain 110, an XOR processing is performed on the 01 and the 11 to obtain 10, and the processed 110 and the 10 obtained are combined to obtain first target feature bit information 11010. An XOR processing is performed on the 011 and the 010 to obtain 101, an XOR processing is performed on the 11 and the 10 to obtain 01, and the processed 101 and the 01 obtained are combined to obtain second target feature bit information 10101.

An XOR processing is performed on the 010 and the 101 to obtain 111, an XOR processing is performed on the 10 and the 01 to obtain 11, and the processed 111 and the 11 obtained are combined to obtain third target feature bit information 11111.

Figure 10:
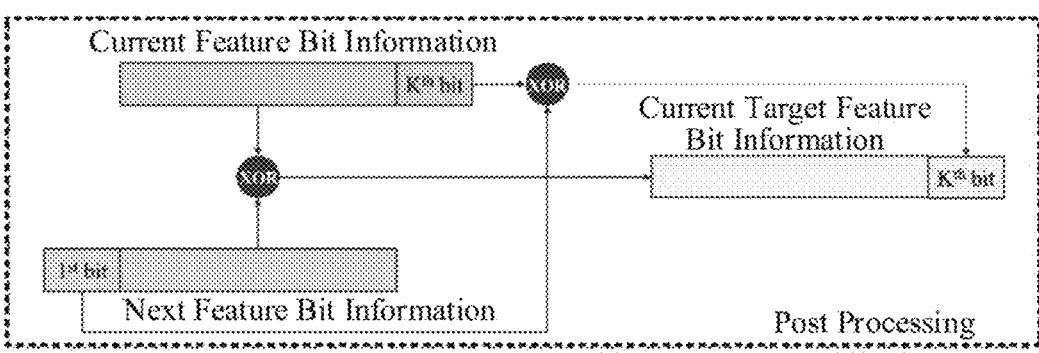
FIG. 10 is a schematic diagram of principle of post-processing according to an implementation of the present application.

In the embodiment shown in FIG. 10, for the feature bit information with K bits, the current feature bit information is divided into a first portion including the previous K−1 bits and a second portion including the K-th bit, and the next feature bit information is divided into a third portion including the first bit and a fourth portion including the second bit to the K-th bit.

In other implementations, the division of the first portion and the second portion and the division of the third portion and the fourth portion may not be limited to the implementations discussed above, but may be changed according to actual needs.

Figure 11:
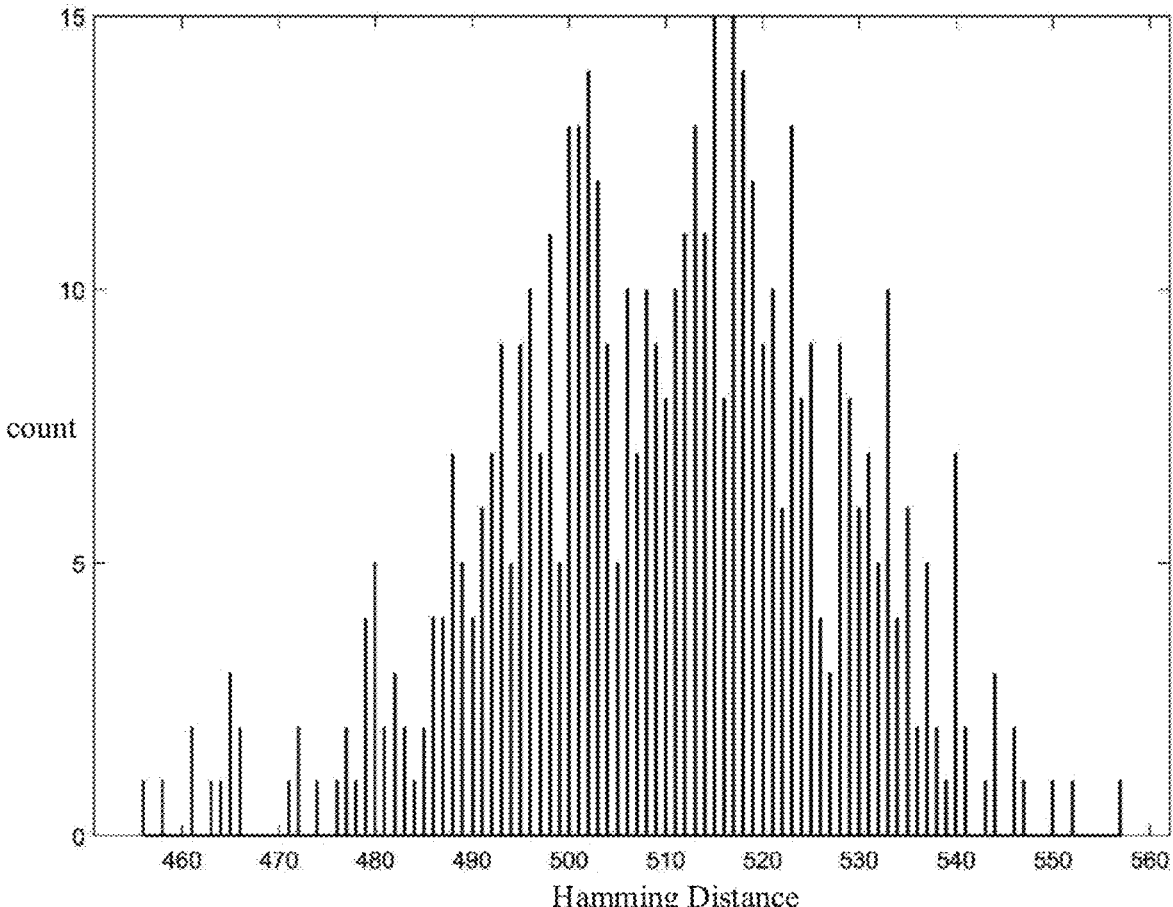
FIG. 11 is a schematic diagram of statistics results of Hamming distance according to an implementation of the present application.

Referring to FIG. 11, in some examples, the extended target response sequence is tested. Specifically, the number of elements in the challenge sequence is defined as K=32, and the value range of the challenge sequence is [t, t+1023], that is, 1024 challenges are arbitrarily continuously taken to obtain 1024 target response sequences, and the Hamming distance calculation of 1024 target response sequences is performed to obtain Hamming distance statistics. It may be understood that, the randomness of the output may be indicated through Hamming distance calculation of the target response sequence. The calculation formula of the Hamming distance HD is:

$$HD = \frac{\sum \left( FFB(F, ORD)_i^m \oplus FFB(F, ORD)_j^m \right)}{1}$$

It should be noted that, Hamming distance is a concept, which indicates the different numbers of bits corresponding to two words (of the same length), and we use d (x, y) to indicate the Hamming distance between two words x and y. An XOR operation is performed on two strings and the number of results being 1 is counted, and then this number is the Hamming distance.

Those of ordinary skill in the art may realize that the modules and algorithm steps of each example described in combination with the embodiments disclosed in the present disclosure may be implemented by electronic hardware or a combination of computer software and electronic hardware. Whether these functions are executed by hardware or software depends on a specific application and design constraints of the technical solution. The skilled artisan may use a different method to realize the described functions for each specific application, but such realization shall not be regarded as beyond the scope of the present application.

In the several embodiments provided in the present application, it is to be understood that the disclosed electronic devices, apparatus and method may be implemented in other ways. For example, the apparatus embodiment described above is only schematic. For example, the division of the module is only logical function division, and there may be other division ways in practical implementation. For example, multiple modules or assemblies may be combined or integrated into another system, or some features may be omitted or not executed. In addition, the coupling or direct coupling or communication connection between each other displayed or discussed may be indirect coupling or communication connection between apparatuses or modules via some interfaces, and may be electrical, mechanical or in other forms.

The modules described as separate parts may be or may be not physically separated. The parts displayed as modules may be or may be not physical modules. That is, the parts may be in the same location, or may be distributed on multiple network modules. Part or all of the modules may be selected according to an actual need to achieve the objective of the solution of the embodiment.

In addition, various functional modules in various embodiments of the present application may be integrated into one processing module, or various modules may exist physically and separately, or two or more modules may be integrated into one module.

The foregoing are merely specific embodiments of the present application, but the protection scope of the present application is not limited thereto. Any person skilled in the art may readily conceive variations or substitutions within the technical scope disclosed by the present application, which should be included within the protection scope of the present application. Therefore, the protection scope of the present application shall be subject to the protection scope of the claims.

The invention claimed is:

1. An information processing method, comprising:
acquiring a challenge sequence of a challenge response pair, and generating an original response sequence corresponding to the challenge response pair through a Physical Uncloned Function;
generating a first index parameter according to the challenge sequence, and acquiring feature bit information in the original response sequence according to the first index parameter;
converting the challenge sequence to generate a second index parameter, and updating the first index parameter according to the second index parameter and the feature bit information;
acquiring new feature bit information in the original response sequence according to the updated first index parameter; and
repeatedly generating second index parameters, and updating the first index parameter according to the second index parameters and latest acquired feature bit information and acquiring a plurality pieces of the feature bit information to generate a target response sequence according to the plurality pieces of feature bit information;
wherein generating the first index parameter according to the challenge sequence comprises: shortening the challenge sequence to the first index parameter with a preset length by using a Hash Function;
wherein updating the first index parameter according to the second index parameter and the feature bit information comprises: decoding the second index parameter to obtain an interception starting position, and intercepting the feature bit information with the preset length according to the interception starting position to update the first index parameter.

2. The information processing method according to claim 1, wherein converting the challenge sequence to generate the second index parameter comprises:
shifting the challenge sequence to left by an offset value to convert the challenge sequence, and shortening the converted challenge sequence to the second index parameter with a preset length by using the Hash Function.

3. The information processing method according to claim 2, wherein the offset value is determined according to the number of the plurality pieces of feature bit information acquired.

4. An information processing method, comprising:
acquiring a challenge sequence of a challenge response pair, and generating an original response sequence corresponding to the challenge response pair through a Physical Uncloned Function;
generating a first index parameter according to the challenge sequence, and acquiring feature bit information in the original response sequence according to the first index parameter;
converting the challenge sequence to generate a second index parameter, and updating the first index parameter according to the second index parameter and the feature bit information;
acquiring new feature bit information in the original response sequence according to the updated first index parameter; and
repeatedly generating second index parameters, and updating the first index parameter according to the second index parameters and latest acquired feature bit information and acquiring a plurality pieces of the feature bit information to generate a target response sequence according to the plurality pieces of feature bit information;
wherein generating the target response sequence according to the plurality pieces of feature bit information comprises:
performing post processing on the plurality pieces of feature bit information to obtain the target response sequence after transformation;
wherein current feature bit information is divided into a first portion and a second portion, a next piece of feature bit information is divided into a third portion and a fourth portion, and performing the post processing on the plurality pieces of feature bit information comprises:
performing a first logical operation processing on the first portion and the fourth portion to obtain a first target portion;

performing a second logical operation processing on the second portion and the third portion to obtain a second target portion; and combining the first target portion and the second target portion to form the current target feature bit information.

5. The information processing method according to claim 4, wherein a length of the first portion is the same as a length of the fourth portion, a length of the second portion is the same as a length of the third portion, and performing the post processing on the plurality pieces of feature bit information comprises:

sequentially performing an XOR processing on the first portion and the fourth portion according to the number of bits to obtain the first target portion;

sequentially performing an XOR processing on the second portion and the third portion according to the number of bits to obtain the second target portion; and combining the first target portion and the second target portion to form the current target feature bit information.

6. An information processing apparatus, comprising at least one processor and a memory storing computer programs runnable on the at least one processor, wherein when the at least one processor executes the computer programs, functions of a sequence acquisition module, a first information acquisition module, a parameter update module, a second information acquisition module and a processing module are implemented;

wherein the sequence acquisition module is configured to acquire a challenge sequence of a challenge response pair and generate an original response sequence corresponding to the challenge response pair through a Physical Uncloned Function;

the first information acquisition module is configured to generate a first index parameter according to the challenge sequence and acquire feature bit information in the original response sequence according to the first index parameter, wherein generating the first index parameter according to the challenge sequence comprises: shortening the challenge sequence to the first index parameter with a preset length by using a Hash Function;

the parameter update module is configured to convert the challenge sequence to generate a second index parameter and update the first index parameter according to the second index parameter and the feature bit information, wherein updating the first index parameter according to the second index parameter and the feature bit information comprises: decoding the second index parameter to obtain an interception starting position, and intercepting the feature bit information with the preset length according to the interception starting position to update the first index parameter;

the second information acquisition module is configured to acquire new feature bit information in the original response sequence according to the updated first index parameter; and the processing module is configured to repeatedly generate second index parameters and update the first index parameter according to the second index parameter and latest acquired feature bit information and obtain a plurality pieces of feature bit information to generate a target response sequence according to the plurality pieces of feature bit information.

7. An electronic device, comprising one or more processors and a memory; and one or more programs, wherein the one or more programs are stored in the memory and executed by the one or more processors, and the program comprises instructions for executing the information processing method according to claim 1.

8. A non-transitory computer storage medium, comprising a computer program stored thereon, wherein the computer program is executed by a processor to implement the information processing method according to claim 1.

9. An electronic device, comprising one or more processors and a memory; and one or more programs, wherein the one or more programs are stored in the memory and executed by the one or more processors, and the program comprises instructions for executing the information processing method according to claim 4.

10. A non-transitory computer storage medium, comprising a computer program stored thereon, wherein the computer program is executed by a processor to implement the information processing method according to claim 4.

* * * * *